United States Patent

[11] 3,569,934

| | | | |
|---|---|---|---|
| [72] | Inventor | Josephus O. Parr, Jr. San Antonio, Tex. | |
| [21] | Appl. No. | 784,346 | |
| [22] | Filed | Dec. 17, 1968 | |
| [45] | Patented | Mar. 9, 1971 | |
| [73] | Assignee | Petty Geophysical Engineering Company San Antonio, Tex. | |

[54] METHOD OF DETECTING AND CORRECTING ERRORS IN MULTIPLEXED SEISMIC DATA
5 Claims, 10 Drawing Figs.

[52] U.S. Cl. .................................................. 340/146.1, 235/151.3
[51] Int. Cl. ................................................. G06k 5/00, G11b 27/36, H03k 5/18
[50] Field of Search ........................................... 179/100.2 (B); 235/151.13, 151.3, 153; 340/146.1, 174 (ED), 174.1 (B)

[56] References Cited
UNITED STATES PATENTS

| | | | |
|---|---|---|---|
| 3,115,620 | 12/1963 | Cooper et al. ............... | 340/146.1X |
| 3,119,098 | 1/1964 | Meade ......................... | 340/146.1X |

Primary Examiner—Eugene G. Botz
Assistant Examiner—R. Stephen Dildine, Jr.
Attorney—Watson, Cole, Grindle & Watson ABSTRACT: A method for the detection and correction of errors in multiplexed data whereby the data is initially identified and counted to determine whether or not there are complete sets of data and subsequent data examination to detect errors in individual bit groups. Previously validated data is substituted for incorrect data to provide a useful data collection.

INVENTOR
JOSEPHUS O. PARR, JR.

BY Watson, Cole, Grindle & Watson
ATTORNEYS

INVENTOR
JOSEPHUS O. PARR, JR.

BY Watson, Cole,
Grindle & Watson
ATTORNEYS

INVENTOR
JOSEPHUS O. PARR, JR.

INVENTOR
JOSEPHUS O. PARR, JR.

BY Watson, Cole, Grindle & Watson
ATTORNEYS

Patented March 9, 1971

INVENTOR
JOSEPHUS O. PARR, JR.

BY Watson, Cole, Grindle & Watson
ATTORNEYS

METHOD OF DETECTING AND CORRECTING ERRORS IN MULTIPLEXED SEISMIC DATA

This invention relates to the accurate reception of multiplexed data and more particularly with the reception of digitally recorded seismic data and provides a method for the detection and correction of errors in such multiplexed digital data.

In digital recording of seismic data, a multiplicity of input signals are scanned or sampled in repetitive time sequence and assembled in multiplexed format on magnetic tape. More specifically, the data samples are recorded sequentially on the tape with their particular longitudinal position or location identifying the selected sample, and the recording tracks, spaced laterally across the tape, representing the quantizing levels or, in total, the amplitude value of each sample as defined in binary digits. Seismic digital recorders typically provide 31 signal channels which are sampled in a single scanning sweep. Since samples of each channel are usually taken at 1 or 2 millisecond intervals, and each sample or amplitude value may consist of 18 or more bits, it is apparent that a large amount of information must be accurately assembled in multiplexed form.

Although such digital recorders have reached a relatively high state of reliability, they do not provide completely error-free recordings. Certain error indication circuits are included in the field recorders, but the number of checks provided is not all-inclusive. Furthermore, the errors are often noted most frequently during the recording of a seismic shot or impact for which repetition would be both costly and time-consuming. As a consequence, seismic digital recordings may contain various errors or faults, particularly in the multiplexing or format arrangement, which must be detected and corrected before the usual processing techniques, such as stacking, filtering, etc. can be applied.

By way of example, the start of the scanning operation, which usually defines the shot instant or time break, may be poorly or improperly recorded; the total number of samples or words in the data scan may be incorrect; or, there may be bit errors in the individual samples. Such errors may lead to lack of synchronization, improper combination of data during the processing or in the reassembled demultiplexed form, and much distortion and noise in the final data output. In some instances the errors may preclude even the initial processing steps.

According to the method of this invention, errors in digitally recorded seismic data, in multiplexed format, are first detected and located by a series of validity or redundancy checks. Defective data scans, or portions of such scans, are then removed and replaced with valid scans or samples from the most recent preceding valid information. For some recordings, the corrective process may involve substitution of one or more data scans of all information channels. In other instances, only certain individual data samples or values may require replacement. Occasionally, replacement of entire data scans as well as corrections for certain samples therein may be necessary. Other corrective procedures, such as the replacement of portions of samples, the substitution of more remote data, and the use of later as well as earlier substitute data, are contemplated within the general scope of this method.

The primary object of the invention is to provide a method for the detection and correction of errors present in multiplexed seismic data.

A further object is to accomplish such corrections with a minimum of distortion to the data.

Another object is to detect defective blocks or samples of data and to apply smoothing corrections by removal and replacement with blocks or samples from preceding valid data.

The principles and applications of the invention will be more clearly understood with reference to the accompanying drawings wherein.

Figure 1:
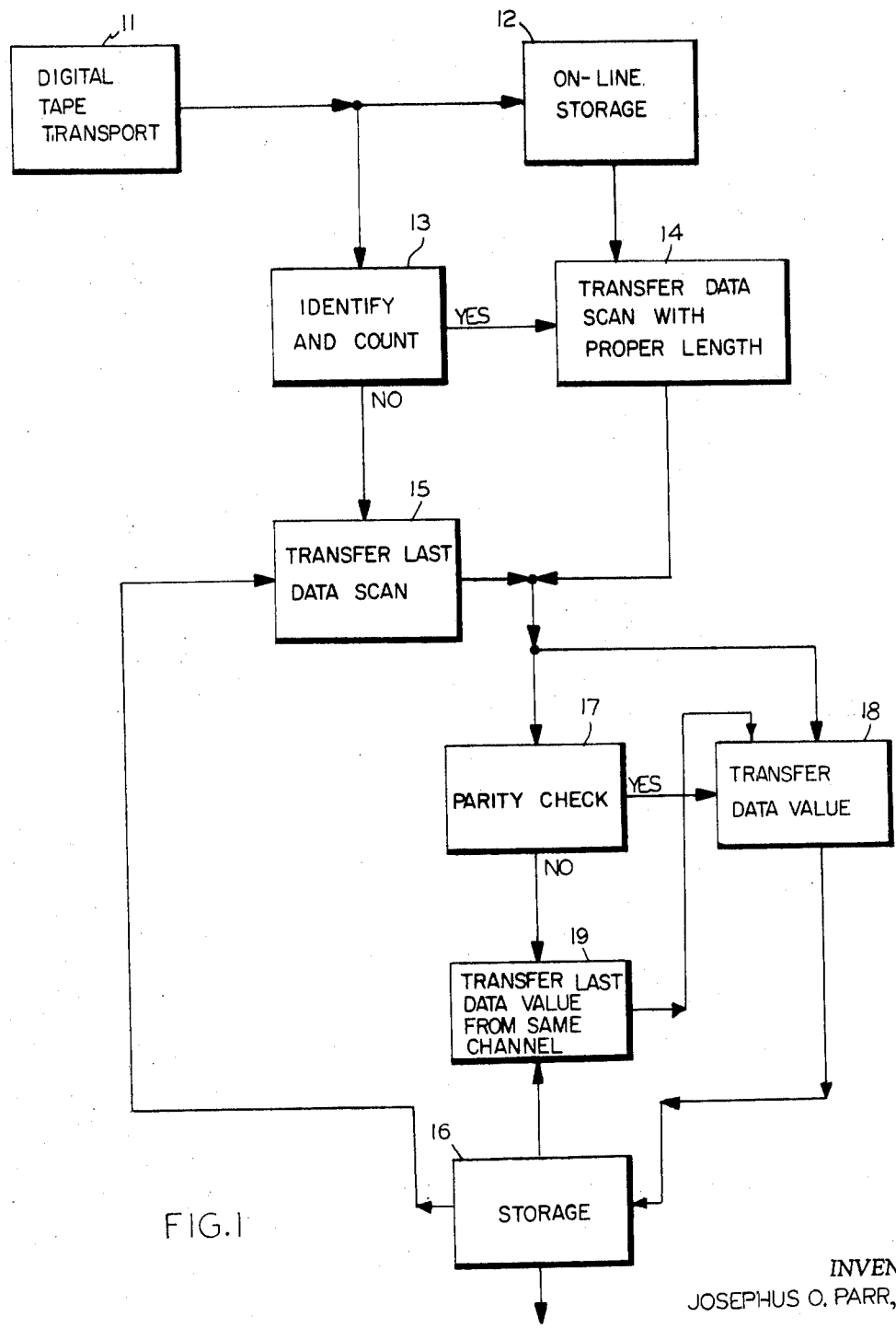
FIG. 1 is a block diagram showing the basic steps according to the method of the invention.

The basic steps of the invention will now be described with reference to FIG. 1. Seismic data in multiplexed format is delivered by digital tape transport 11 which operates in response to clock and control signal circuitry (not shown). At each operation of transport 11, a predetermined quantity or "block" of data corresponding to one complete data scan is read into online storage 12 which may be a temporary storage device such as a digital register. Simultaneously with the delivery of the samples comprising the data scan or block to online storage 12, the identification characters for the particular format are applied to identify and count element 13. For example, the unique start-of-data sample may be identified; the block address read and compared with the predetermined correct address; and the number of samples in the block or data scan counted.

If the address and the format characteristics of the block or data scan are determined to be valid by identify and count element 13, transfer data scan element 14 is enabled to receive the entire scan or block of samples from online storage 12. This action clears online storage 12 for acceptance of another data scan at the proper time.

If, however, the block address and/or the format characteristics are determined as invalid by identify and count element 13, transfer last data scan element 15 is enabled to receive a substitute set of data scan samples from the previous valid data scan present in storage 16. Simultaneously, the invalid data scan samples are deleted in online storage 12.

Transfer data value element 18 is then enabled, by clock and control circuitry not shown, to receive serially, one sample or data value at a time, either the data scan stored temporarily in transfer data scan element 14 or the substitute data scan samples in transfer last data scan element 15. Each sample of the valid data scan from transfer data scan element 14, or substitute data scan from last data scan element 15, is tested for parity by parity check element 17 for internal validity. Error detection by way of a parity check of a coded multidigit data sample is well known in the digital art and need not be described for the purposes of the invention. Such a parity check indicates a high probability of the sample being error free.

If the data value or sample is valid as indicated by parity check element 17, the sample is removed from transfer data value element 18 and deposited in storage 16. If, however, the data value or sample is invalid, a substitute data sample from storage 16 is transferred to element 19. In brief, the last preceding valid data sample, for the same signal channel, is called in as a "fill" or substitute which enters transfer data value element 18, undergoes further validation test by parity check element 17 and, if found valid, is transferred into storage 16.

After parity has been checked on all data values or samples in the particular data scan, and the full set of valid samples or substitutes transferred into storage 16, another compete data scan is called up from digital tape transport 11, validated or made good by way of substitution, and passed on to storage 16. In this manner each block or complete data scan is checked, for conformance to the format requirements, and each sample in the scan is checked for internal validity.

Whenever complete data scan or data sample substitutions are required, as determined respectively by identify and count element 13 or parity check element 17, such substitutions are made from the nearest preceding valid data scan or data sample. The overall result of the preceding operations is to produce a full set of multiplexed data, in storage 16, which is corrected or smoothed to minimize errors due to format deviations or data sample irregularities.

It is desirable to note that valid smoothing corrections, by way of scan or sample deletion and substitution as described above, are obtainable because of the relationship between the scan interval and the maximum frequencies present in seismic data. For the usual seismic exploration conditions, the sampling interval is set at 2 milliseconds; that is to say, every data or signal input is sampled 500 times each second. On the other hand, the highest frequency encountered in most seismic data is only about 100 Hz, and usually the maximum is no more than 75 Hz. Consequently, the change in amplitude value between adjacent data scans is, for all practical purposes, quite small. Under these conditions, substitution of the immediately preceding, or an even more remote, data sample causes no harmful distortion.

Figure 2:
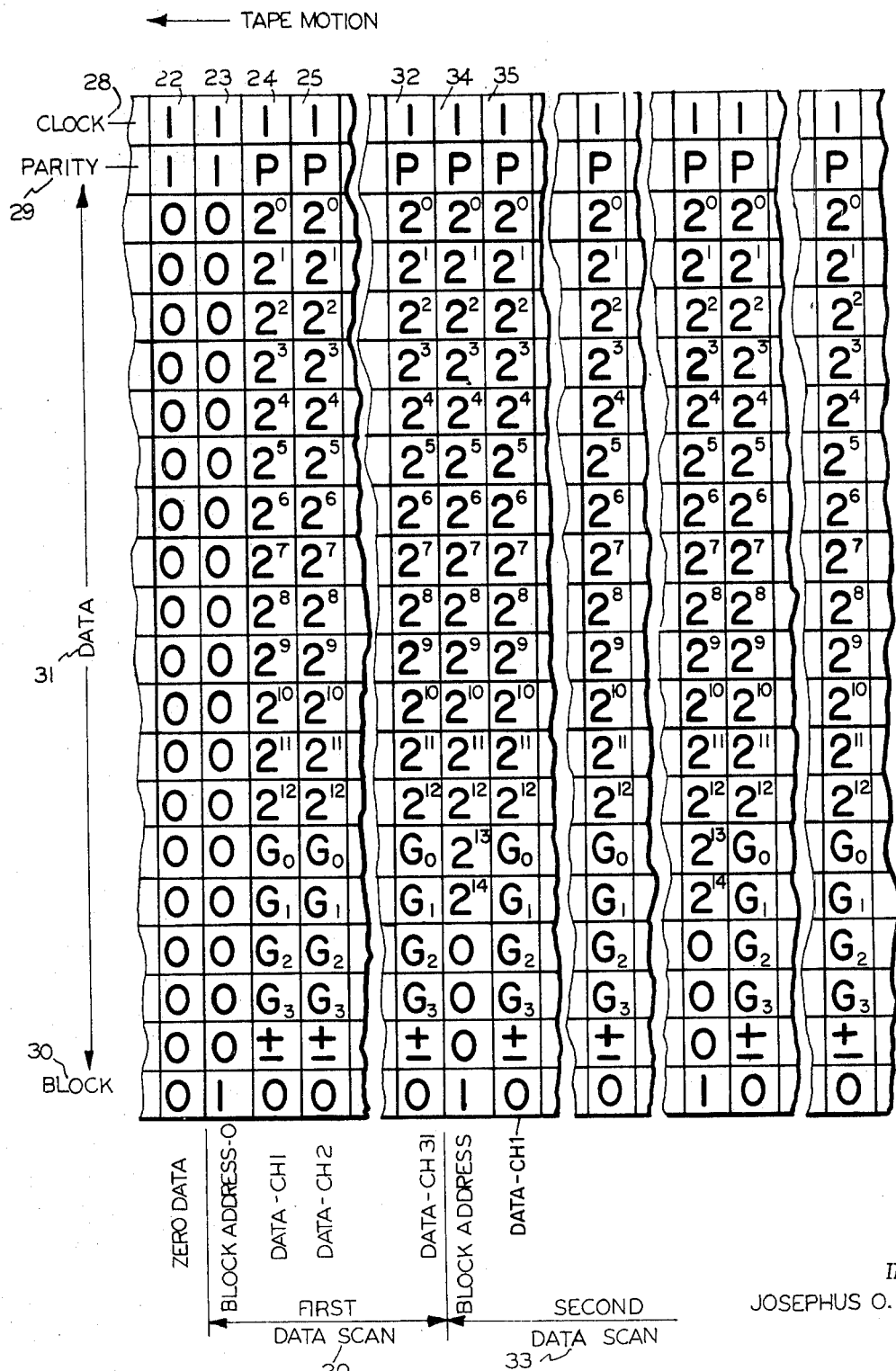
FIG. 2 is an illustration of one tape format used in seismic digital recording showing the multiplexing arrangement of data scans, data samples and auxiliary control tracks.

The error detection and correction process of the invention may be described more completely with reference to the specific multiplexing and format arrangement shown in FIG. 2. This is the "21-track format," well known in the seismic art, in which 21 bit or digit tracks are recorded side-by-side across the tape to present all information associated with one sample in a single sweep or "byte." This block type of format will be described primarily with reference to the arrangement of first data scan 20, which has the block address 0 displayed in sample or "word" 23. Immediately preceding the block address sample 23 is zero data sample 22. It will be noted that all bits in the zero data sample 22 are "off" or 0, excepting the clock bit 28 and parity bit 29. In other words, all data bits as well as the block bit 30 are O for the word or words immediately preceding the block address sample 23.

The start of the first data scan 20 is indicated uniquely by the presence of a 1, for block bit 30, and a block address of 0 as indicated in the 18 data bits 31 of block address word 23. Note that parity bit 29 is set on 1 so as to result in the correct odd parity assigned to this format.

The second sample 24 in first data scan 20 represents the instantaneous amplitude value of the data in seismic channel 1, the value being coded in fourteen bits, $2^0$ to $2^{12}$ including the sign. The $G_0$—$G_3$ bits represent a coded binary gain control value applying to the associated data value in the sample. Parity bit 29, marked P under sample 24, is set automatically in the digital recording process to result in the proper odd parity for the sample. Sampling continues throughout the first data scan until sample 32, representing the last data channel 31, terminates the scan.

The second block or complete data scan 33 starts with the unique indicator 1 in the block bit track 30. The block address representing the elapsed time, in milliseconds, since the occurrence of block address 0 is recorded in the 15 bits $2^0$ to $2^{14}$ of block address sample 34. The next sample 35 represents the second value of data for seismic channel 1. Sampling of the remaining data channels continues as described previously for the first data scan 20. The overall format continues until all block addresses have been presented and a unique end-of-record indicator is recorded. The usual seismic recording, of 6 seconds duration and with sampling at 2 millisecond intervals, will contain 3000 such complete data scans or "blocks."

Certain unique or identifying characteristics are apparent in the format of FIG. 2. Block address 0, or the start of the first data scan 20, is uniquely indicated by a 1 in block track 30 and all 0s in the data bits of block address 23. Successive block addresses are indicated uniquely by the 1 in block bit track 30 and the elapsed time, in milliseconds, in data bits 31. The number of samples between block addresses may be counted by detecting the 0s in block bit track 30. The parity for any sample may be checked by counting the number of 1 bits in the particular sample and determining whether this number is odd or even. These unique identification features are utilized in the present invention to provide checks on the validity of the structure of the complete data scans, or blocks, and the internal validity of each sample therein.

Figure 3:
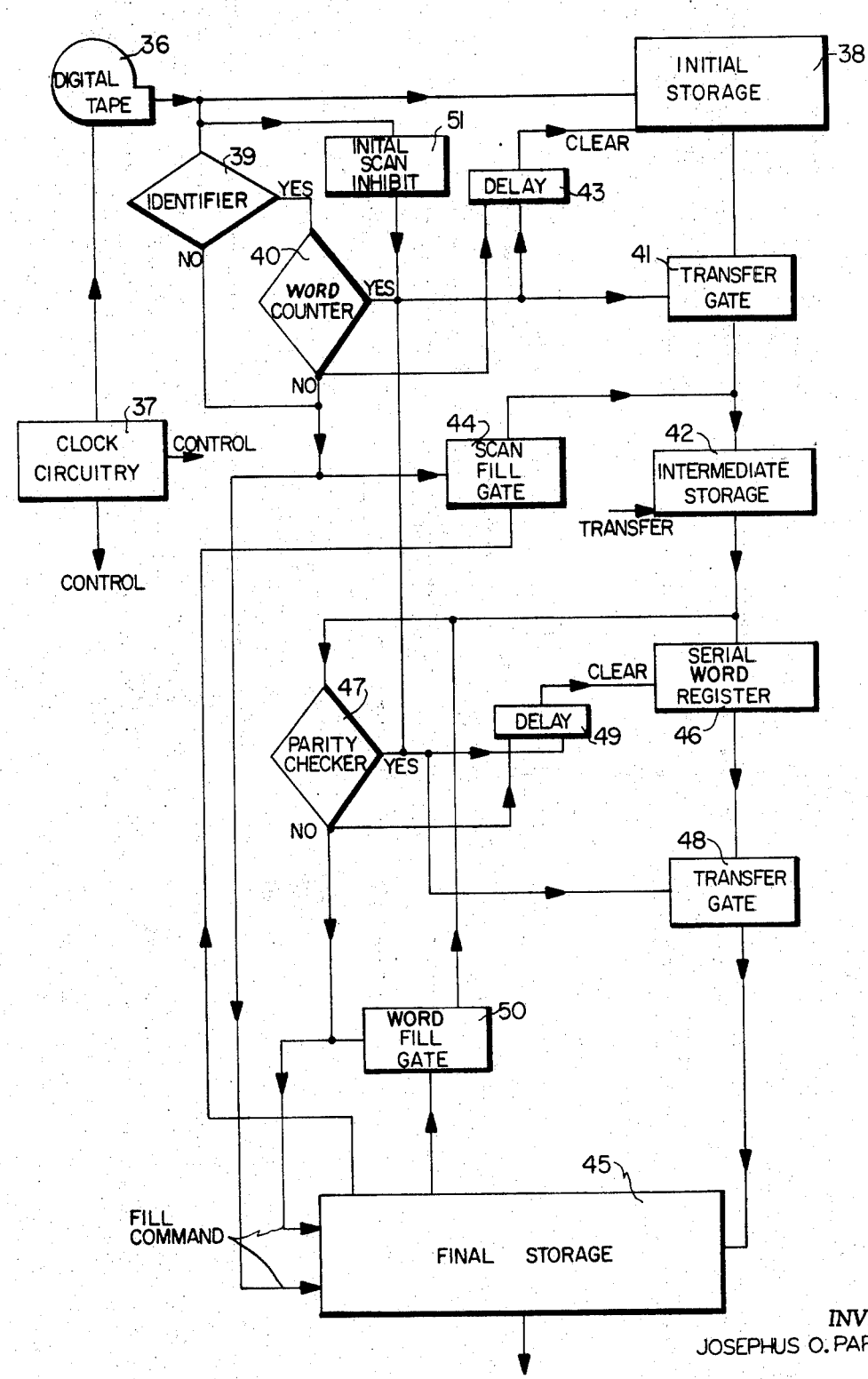
FIG. 3 is a schematic block diagram showing one possible arrangement for the functional accomplishment of the method.

Referring now to FIG. 3, the invention will be described in somewhat more detail with respect to the carrying out of the various steps. A digital tape 36 is mounted on a suitable tape transport for playback under the control of clock circuitry 37 which also controls the timing or gating of the various components. An initial block of data, such as data scan 20 (FIG. 2) is first read into the initial storage 38, which may be a digital register capable of receiving, temporarily storing and transmitting the information contained in one complete block or data scan.

As data is read into initial storage 38, the block or data scan format is checked for validity by identifier 39 and word counter 40. The start of the block may be identified by detection of the 1 condition in block bit track 30; the actual block address value, in the data bits, may also be checked as a further identification. Data samples following the block address 1 bit are counted by detecting the 0s in the block bit track 30; the total block track 30 count should be a 1 followed by 31 0s for the format of FIG. 2. If the block bit 30 and block address 23 are valid, and the sample or "word" count is correct, a transfer gate 41 is enabled to transmit all the information representing the first data scan from the initial storage 38 to intermediate storage 42. If, on the contrary, either the block address or the word count is invalid, as revealed by identifier 39 and word counter 40, scan fill gate 44 is enabled to transfer the last valid data scan from final storage 45 to intermediate storage 42. For either decision, transfer or fill, a signal is transmitted via delay 43 to initial storage 38 to clear the locations.

In the next step each sample or work in the data scan present in intermediate storage 42 is checked for internal validity by application of the parity checker 47. Each sample or word is transferred sequentially into serial word register 46, meantime being tested for correct parity by the process of counting the number of 1's in the word and determining whether that number is odd or even. If the parity is correct (odd for the 21-track format of FIG. 2), transfer gate 48 is enabled and the single valid sample is transferred to final storage 45. If, however, the parity is incorrect, indicating internal irregularity in the sample, word fill gate 50 is enabled to effect transfer of the nearest preceding valid word or sample (for the same channel) stored in final storage 45. This substitute or "fill" sample is then checked for parity as before and, if valid, transferred via transfer gate 48 to occupy a location in final storage 45. For either decision, utilizing either the original or the substitute sample or word, the serial word register 46 is cleared by application of a signal via delay 49. Another sample is then transferred from intermediate storage 42 into serial word register 46, and the transfer/check process continues until the entire set of samples representing a full data scan have been moved via transfer gate 48 to final storage 45.

In the above process, it will be noted that no data is initially available in final storage 45 to serve as substitutes or "fill" upon command of the decision functions 39, 40 and 47. Accordingly, it is desirable to bypass the validity checks initially and transfer the first data scan, corresponding to block address 0 in FIG. 2, into final storage 45 without corrective substitution. This direct transfer can be accomplished by recognizing the initial block address in block address sample 23 and enabling an initial scan inhibit element 51 which in turn enables the transfer gates 41 and 48 to permit through transmission of the initial block of data. In this manner, the initial block address 23, representing the seismic time break and start of data, will be retained as a reference even if the first data block is found defective. After the first block of data is transferred into final storage 45, the initial scan inhibit element 51 remains inactive so that subsequent blocks of data must pass the validity checks or be corrected by substitution.

Figure 4:
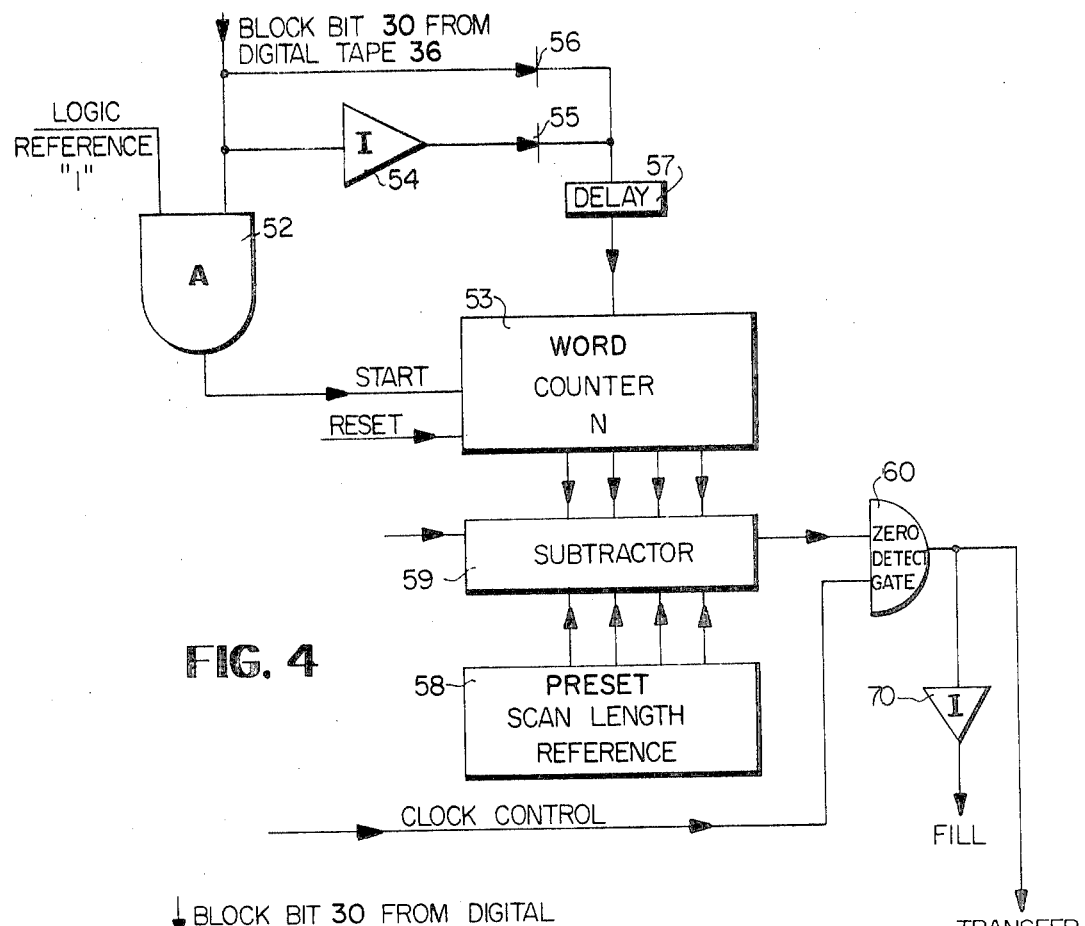
FIG. 4 illustrates in detail the identify and word count decision elements of FIG. 3.

Additional details on identifier 39 and word count function 40 are shown in FIG. 4 wherein block bit 30 is identified by AND gate 52, inverter 54 and diodes 55 and 56; and the word count check is accomplished by word counter 53, subtracter 59, preset scan length reference 58, toe together with recognition circuitry comprised by zero detect gate 60 and inverter 70. The logic reference is set at 1 on AND gate 52 so that arrival of the unique block bit 1 makes the gate true and an output "start" signal is applied to word counter 53 which may be comprised by the usual arrangement of binary flip-flops. Introduced via inverter 54, the initial or block address bit 1 is inverted and applied by way of diode 55 and delay 57 to word counter 53. Likewise, the 31 following o block bits, representing the 31 data samples or words, are applied to word counter 53. It will be understood, of course, that the input to the word counter 53 can be arranged to accept either 1's or 0s as triggers. Since the valid number of samples in the data scan is known to be 32, a preset scan length reference unit 58 can be arranged to present the reference bits to subtractor 59. If the sample or word count is equal to the correct reference number set into the scan length reference unit, the remainder output from subtracter 59 will be zero so that zero detect gate 60 will produce the proper output signal for enabling of transfer gate 41 (FIG. 3). If, however, the sample or word count is invalid, the zero detect gate 60 will not be satisfied and a signal will be directed via inverter 70 to enable scan fill gate 44 (FIG. 3).

Figure 4A:
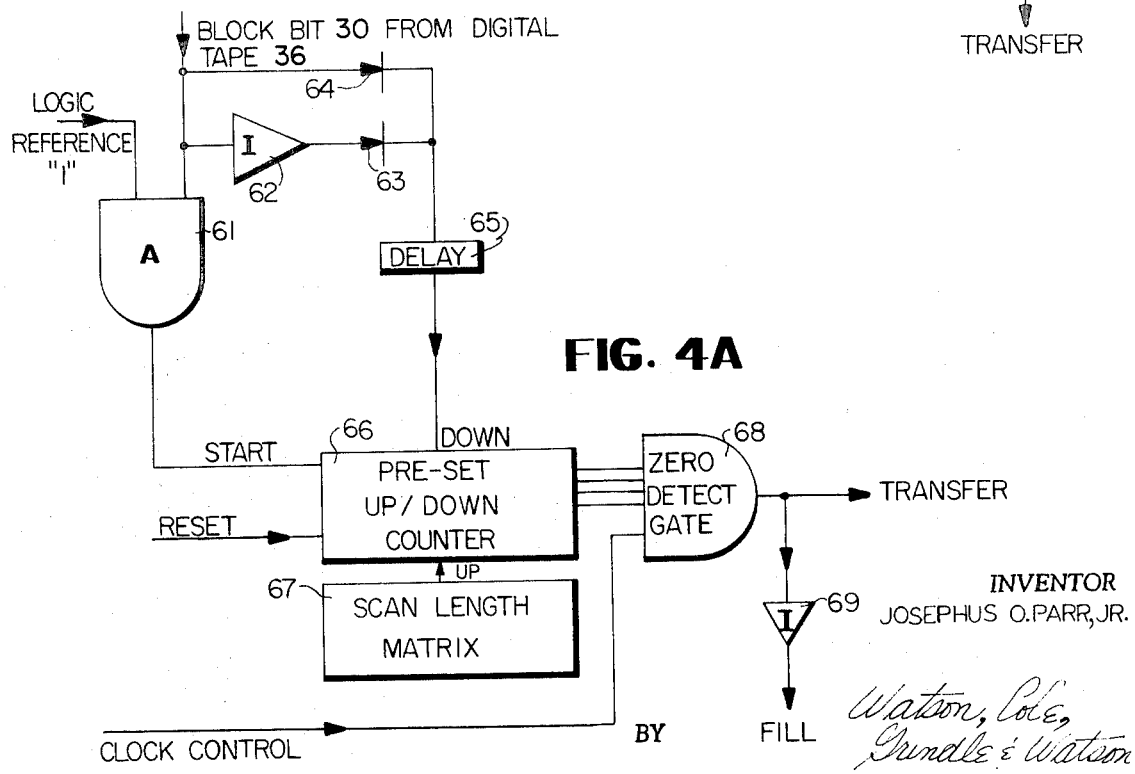
FIG. 4a shows a preferred arrangement for the identify and word count decision elements.

An alternate, more simple arrangement for implementing the identifier 39 and word counter 40 is shown in FIG. 4a, wherein the word count is effected by way of a preset up/down counter 66 which is referenced to the initial correct up count by a preset scan length matrix 67. AND gate 61, inverter 62, and diodes 63 and 64 perform the same identification functions described above in connection with FIG. 4. Preset up/down counter 66 is set at an initial up count of 32, corresponding to the 21 track format shown in FIG. 2. Again, the preset up/down counter 66 is started or enabled by the identified block bit 1 which activates AND gate 61. Input pulses corresponding to the initial block bit 30 and the following 0 block bits effect DOWN counting in up/down counter 66; if the down count negates the preset UP count, the resulting zero output condition of up/down counter 66 makes zero detect gate 68 true and an enable signal is applied to transfer gate 41 (FIG. 3) to accomplish transfer of the entire valid data block or scan.

If the number of samples in the data scan is incorrect, however, the preset UP count in up/down counter 66 is not counted DOWN to zero, the zero detect gate 68 is not satisfied, and a full output enabling signal is applied via inverter 69 to scan fill gate 44 (FIG. 3). As a result, the invalid data scan is replaced completely by the nearest preceding valid data scan from final storage 45.

Figure 5:
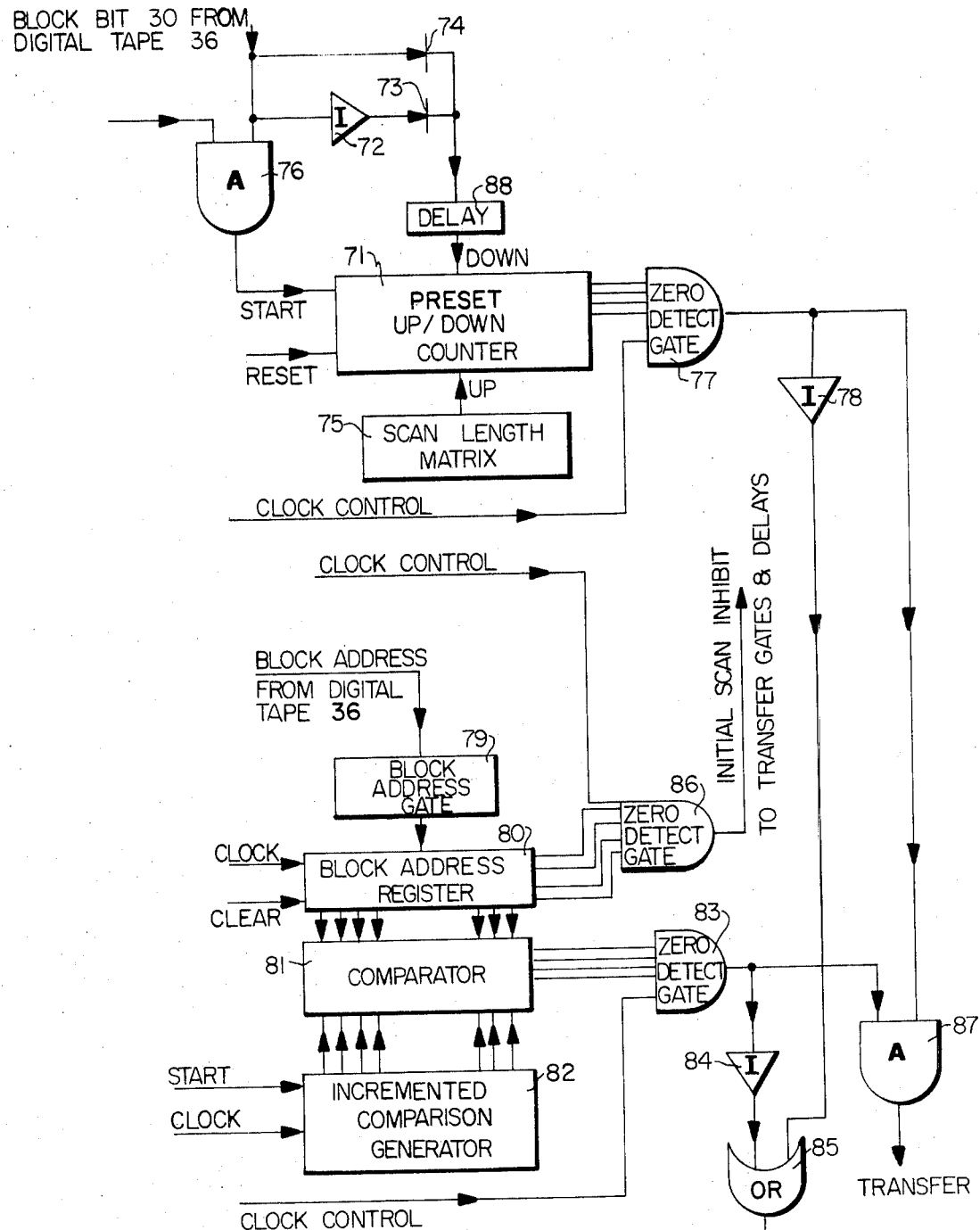
FIG. 5 shows a further modification of the identify and word count elements in which provision is made for identifying the complete block address as well as producing an initial scan inhibit control signal.

A more complete identification of the entire block address is provided in the arrangement shown in FIG. 5. As in the arrangement of FIG. 4a, a preset up/down counter 71, with predetermined scan length matrix 75 is employed to effect recognition of the proper sample or word count. Counting is initiated by proper identification of the block bit 1 via AND gate 76. Actuation of the transfer enabling signal from zero detect gate 77 is inhibited, however, by additional AND gate 87 until the block address is validated. The fill signal from zero detect gate 77 is transmitted directly via inverter 78 and OR gate 85 to enable scan fill gate 44 (FIG. 3).

Block address bits are read via block address gate 79 into block address register 80. A reference or pseudoaddress corresponding to the correct expected address is created by way of incremented comparison generator 82. As an example, comparison generator 82 may furnish an initial value corresponding to the initial block address 0, and then be incremented in intervals corresponding to the sampling intervals for the format. In a particular application, the increments might be 2 milliseconds, such that the expected addresses would be 0, 2, 4, 6, 8, etc. milliseconds.

The block address bits from block address register 80 are applied to comparator 81 for check against the pseudoaddress bits from incremented comparison generator 82. If the block address is valid, the output of comparator 81 is zero and zero detect gate 83 is satisfied such that an output signal is applied to AND gate 87. If zero detect gate 77 also is true, the condition for correct output from AND gate 87 occurs and the transfer signal appears to enable transfer gate 41 (FIG. 3). If the block address is invalid, when checked against the pseudoaddress in incremented comparison generator 82, the output of comparator 81 is not zero, zero detect gate 83 is not satisfied, and the output signal is applied via inverter 84 to OR gate 85 to enable scan fill gate 44 (FIG. 3). It will be noted that the block bit identification and the block address and word count all must be valid to effect transfer of the data scan. On the other hand, any invalidity in the three checks will result in substitution or fill from the preceding valid data.

As mentioned earlier, the internal validity or correctness of each data sample or word is checked simply by determining the parity. In the 21-track format illustrated in FIG. 2, odd parity is used to provide a single-error detector. During the recording of the tape, the total number of 1 bits in the 18 bit "data and sign word" is determined and the parity bit 29 is set to either 1 or 0 to make the total number of 1's odd. In processing the tape, the parity is again checked. If the parity remains odd, error-free transmission is assumed; a change in parity indicates, however, that an internal error has occurred within the bits comprising the word.

Three steps are required in the parity checker 47 (FIG. 3); the total number of 1 bits must be counted; this number must be determined as odd or even; and an output signal must be supplied as an indication of true or false parity. Various logic circuit arrangements have been devised to provide such parity checks. Most of these arrangements utilize a multiplicity of interconnected logic gates to examine the condition of bits comprising the sample or word and make the necessary deductions.

Figure 6:
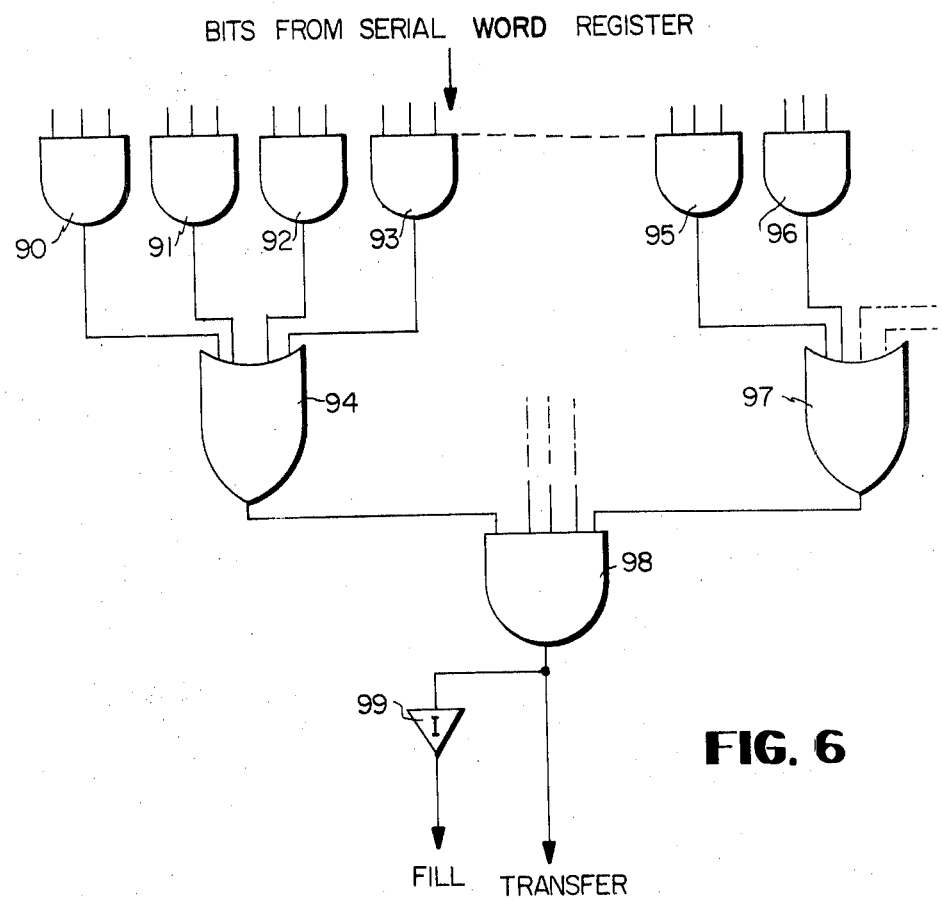
FIG. 6 is a simplified logic diagram illustrating the parity check decision element of FIG. 3.

One such parity check circuit is illustrated in simplified form in FIG. 6 wherein the group of AND gates 90, 91, 92, 93, 95, 96, and so on, is connected to the proper reference terminals indicating the condition of bits in the serial word register 46 (FIG. 3). By suitable interconnection of OR gates 94 and 97, coincidence signals are obtained to operate a final gate 98 which supplies as output a transfer signal when parity is true and a fill signal, via inverter 99, when the indication is false. The true or transfer signal is then used to enable transfer gate 48 so as to place the validated sample in final storage 45. If the sample is found invalid, on the basis of parity check, the fill signal enables the word fill gate 50 to call a substitute preceding sample or word out of final storage 45 (FIG. 3).

Figure 7B:
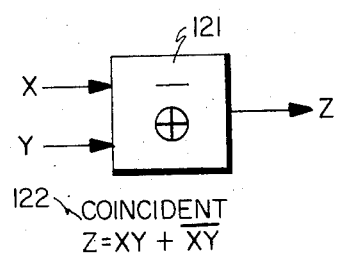
FIGS. 7 and 7a—7b are more detailed logic diagrams showing an arrangement of logic gates for accomplishing a parity check on a multibit data sample.
Figure 7:
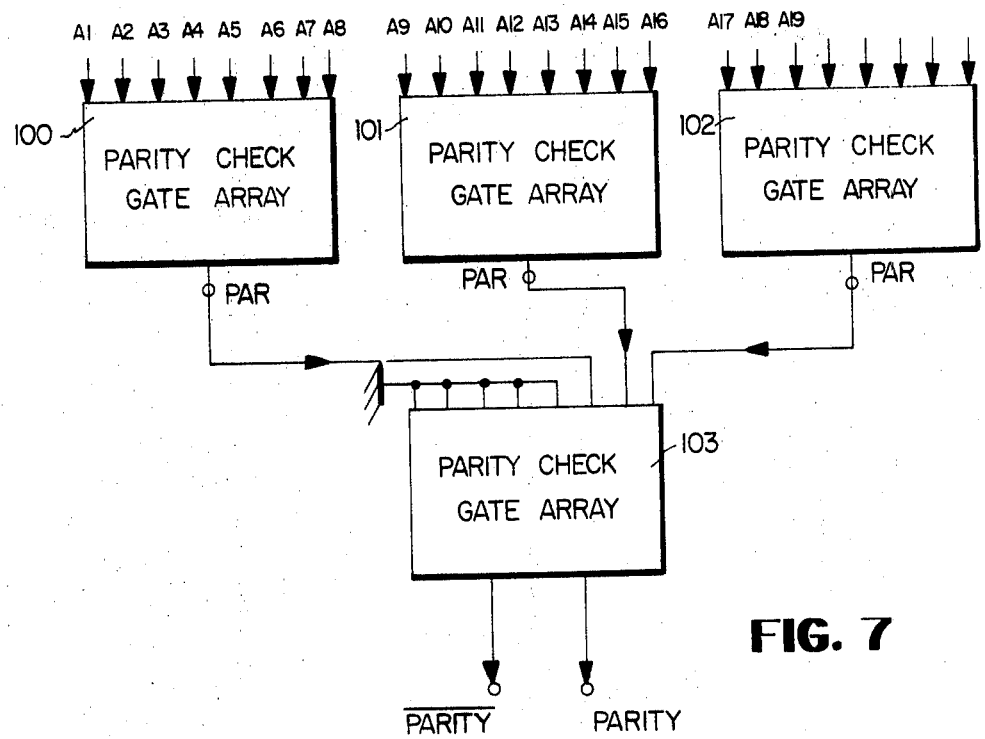

A more complete parity check circuit consisting of a group of logic arrays is shown in FIG. 7. The input terminals $A_1$, $A_2$, $A_3$,..., parity check gate arrays 100, 101, 102 are connected to the appropriate bit terminals on serial word register 46 (FIG. 3). Outputs from parity check gate arrays 100, 101, 102 are then examined in a further parity check gate array 103 which furnishes an output indication of true or false parity, corresponding to a "transfer" or "fill"command, which can be used to enable either transfer gate 48 or word fill gate 50 (FIG. 3).

Figure 7A:
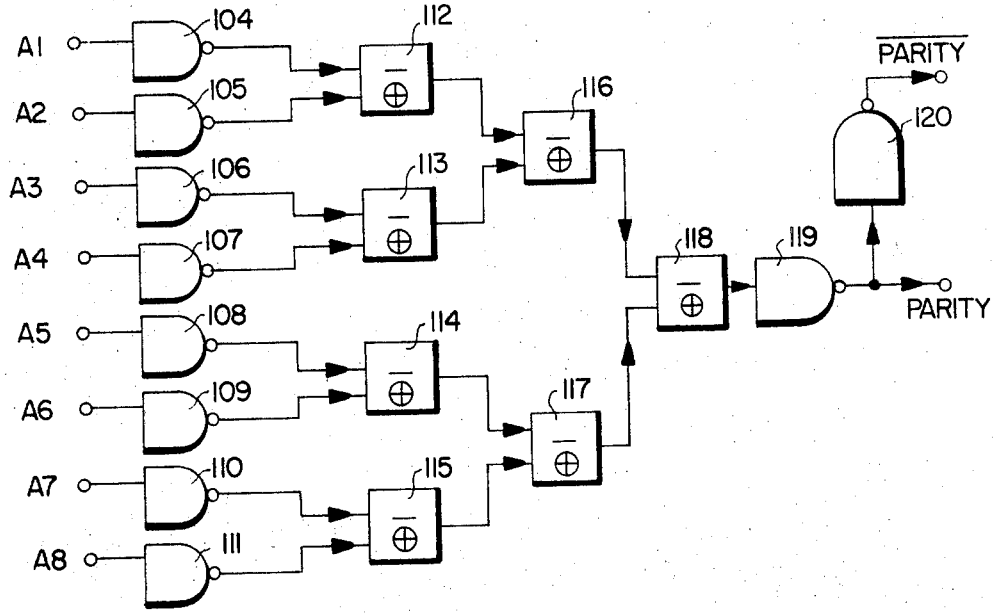

The logic diagram for a single parity check gate array is shown in detail in FIG. 7a. The condition of each bit in serial word register 46 (FIG. 3) is sensed, via input terminals $A_1$, $A_2$, $A_3$,..., by the array which makes the necessary logic deductions by means of coincident circuits 112, 113, 114, 115, 116, 117, 118, and delivers a true or false parity indication through output inverters 119 and 120. The construction of the coincident circuit is illustrated in FIG. 7B wherein the coincident circuit 121 performs the logic operation indicated in logic equation 122.

A parity check array of the type described is marketed by the Sylvania Electronic Components Group, Buffalo, New York under the manufacturer's type number SUHL–SM–120.

Those skilled in the art will recognize other modifications of the method. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

I claim:

1. A method of operating an automatic computing system to verify the transmission of seismic data in multiplexed digital format wherein the seismic signals are assembled in bit groups, the bit groups are assembled in separate samples and the samples are assembled in data scans, comprising the steps of:
   1. transferring successive individual data scans from storage in said computing system;
   2. examining each data scan in said computing system to determine whether there is a complete set of data therein;
   3. substituting a previously examined data scan in said computing system for a successive scan that does not contain a complete set of data; and
   4. transferring the data scans in said computing system to storage for transmission to data processing apparatus.

2. A method according to claim 1 wherein step 2 includes the initial step of examining the data scans in said computing system to determine whether the number of samples within the individual data scans is correct, transference of a complete set of data to intermediate storage in said computing system and then subsequently checking the individual samples of data in said computing system to determine whether the individual bit groups therein are correct.

3. A method according to claim 2 wherein a corresponding sample from the previous data scan is substituted in said computing system for a sample of the data scan currently being checked which is defective.

4. A method according to claim 3 wherein the data scans are checked in said computing system for the correct parity in each of the respective samples.

5. A method of operating an automatic computing system to verify the transmission of seismic data in multiplexed digital format wherein the seismic signals are assembled in bit groups, the bit groups in samples and the samples are assembled in data scans in such a manner that an adjacent subsequent data scan contains information representing an adjacent sample of the seismic signals contained in the digital data, comprising the steps of:
   1. transferring successive individual data scans from storage in said computing system;
   2. examining each of said data scans individually in said computing system to determine if the correct number of samples is represented therein;
   3. substituting a previously acceptable data scan in said computing system for a data scan that does not contain the correct number of samples;
   4. transferring the data scans for further examination in said computing system to determine if the parity of the individual samples is correct;
   5. substituting a sample from the previously acceptable data scan in said computing system for the samples that have incorrect parity, said substituted samples corresponding to the sample that is defective; and
   6. transferring the data scans to storage means in said computing system.